(12) United States Patent
Koshi et al.

(10) Patent No.: US 10,982,889 B2
(45) Date of Patent: Apr. 20, 2021

(54) REFRIGERATION CYCLE APPARATUS

(71) Applicant: Mitsubishi Electric Corporation, Tokyo (JP)

(72) Inventors: Soichiro Koshi, Tokyo (JP); Toshinori Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 16/308,063

(22) PCT Filed: Sep. 8, 2016

(86) PCT No.: PCT/JP2016/076391
§ 371 (c)(1),
(2) Date: Dec. 7, 2018

(87) PCT Pub. No.: WO2018/047264
PCT Pub. Date: Mar. 15, 2018

(65) Prior Publication Data
US 2019/0257564 A1    Aug. 22, 2019

(51) Int. Cl.
*F25B 49/02* (2006.01)
*G05B 15/02* (2006.01)
(Continued)

(52) U.S. Cl.
CPC ............. *F25B 49/022* (2013.01); *F25B 1/00* (2013.01); *G05B 15/02* (2013.01); *F25B 2600/0253* (2013.01); *F25B 2700/2104* (2013.01)

(58) Field of Classification Search
None
See application file for complete search history.

(56) References Cited

U.S. PATENT DOCUMENTS 4,420,947 A * 12/1983 Yoshino ................. F25B 49/02
62/160
4,459,519 A * 7/1984 Erdman .................... H02P 6/16
318/400.08

(Continued)

FOREIGN PATENT DOCUMENTS

CN    100538209 C  *  9/2009 ............. F25B 27/02
CN    101523129 A  *  9/2009 ............... F25B 1/00
(Continued)

OTHER PUBLICATIONS

International Search Report of the International Searching Authority dated Nov. 29, 2016 for the corresponding international application No. PCT/JP2016/076391 (and English translation).

*Primary Examiner* — Mohammad Ali
*Assistant Examiner* — Kelvin Booker
(74) *Attorney, Agent, or Firm* — Posz Law Group, PLC

(57) ABSTRACT

A refrigeration cycle apparatus, in which demand control is performed to adjust electric power, includes: a compressor, a driving rotation speed; a recording device that records, as data, a relationship between the driving rotation speed of the compressor and a temperature difference between a set temperature and a detected temperature, the set temperature being set as desired as a temperature control target for a temperature adjustment target, and the detected temperature being detected by a temperature detecting device disposed at a position at which a temperature of the temperature adjustment target is detected; and a main controller that, in response to a request for the demand control, calculates the temperature difference between the set temperature and the detected temperature, retrieves, from the recording device, data of the driving rotation speed of the compressor corresponding to the calculated temperature difference, and con- (Continued)

trols the compressor based on the retrieved driving rotation speed.

4 Claims, 4 Drawing Sheets

(51) Int. Cl.
*F25B 15/00* (2006.01)
*F25B 1/00* (2006.01)

(56) References Cited

U.S. PATENT DOCUMENTS

| | | | | |
|---|---|---|---|---|
| 5,203,179 | A * | 4/1993 | Powell | F04D 27/0261 62/180 |
| 6,053,001 | A * | 4/2000 | Nunokawa | G05D 23/1904 62/230 |
| 6,241,483 | B1 * | 6/2001 | Kato | F04B 27/1804 417/222.2 |
| 10,022,614 | B1 * | 7/2018 | Tran | B33Y 10/00 |
| 10,220,677 | B2 * | 3/2019 | Ohyama | B60H 1/00385 |
| 10,457,117 | B2 * | 10/2019 | Enomoto | B60H 1/24 |
| 2002/0002834 | A1 * | 1/2002 | Kuroki | F25B 49/027 62/238.6 |
| 2005/0074339 | A1 * | 4/2005 | Asa | F04B 35/002 417/212 |
| 2010/0175401 | A1 * | 7/2010 | Taguchi | F04B 27/1804 62/228.3 |
| 2011/0048046 | A1 * | 3/2011 | Sommer | F04D 29/462 62/228.1 |
| 2012/0042674 | A1 * | 2/2012 | Takenaka | F24F 3/06 62/180 |
| 2012/0111043 | A1 * | 5/2012 | Hatakeyama | F04C 29/0085 62/190 |
| 2012/0324929 | A1 * | 12/2012 | Motegi | B60H 1/00764 62/133 |
| 2013/0219930 | A1 * | 8/2013 | Shin | F25D 23/003 62/79 |
| 2014/0208783 | A1 * | 7/2014 | Lee | F25D 17/045 62/89 |
| 2014/0291411 | A1 * | 10/2014 | Tamaki | F24D 17/001 237/2 B |
| 2015/0040595 | A1 * | 2/2015 | Tamaki | F24F 5/0096 62/159 |
| 2015/0219379 | A1 * | 8/2015 | Sun | F25B 1/10 62/115 |
| 2016/0109163 | A1 * | 4/2016 | Enomoto | F25B 13/00 62/160 |
| 2016/0116191 | A1 * | 4/2016 | Tamaki | F25B 13/00 62/160 |
| 2016/0146521 | A1 * | 5/2016 | Tomita | F25B 49/022 62/126 |
| 2016/0238308 | A1 * | 8/2016 | Uchida | F25D 17/065 |
| 2017/0261246 | A1 * | 9/2017 | Park | H02P 29/62 |
| 2017/0370605 | A1 * | 12/2017 | Makino | F24F 11/77 |

FOREIGN PATENT DOCUMENTS

| | | | | |
|---|---|---|---|---|
| JP | H11-325539 A | | 11/1999 | |
| JP | WO2009/101818 A1 * | | 6/2011 | F25B 9/06 |
| JP | 2011-149572 A | | 8/2011 | |
| JP | 5070301 B2 * | | 11/2012 | F25B 1/00 |
| JP | 2013-200063 A * | | 10/2013 | F25B 1/00 |
| JP | 2014-047989 A | | 3/2014 | |
| JP | 2014-075935 A | | 4/2014 | |

* cited by examiner

| TEMPERATURE DIFFERENCE GROUP | DRIVING ROTATION SPEED |
|---|---|
| t < 0 | 30.2 |
| 0 ≦ t < 1 | 47.6 |
| 1 ≦ t < 2 | 60.4 |
| 2 ≦ t < 3 | 71.5 |
| 3 ≦ t < 4 | 80.2 |
| 4 ≦ t < 5 | 87.5 |
| 5 ≦ t < 6 | 94.8 |
| 6 ≦ t | 96.0 |

REFRIGERATION CYCLE APPARATUS

CROSS REFERENCE TO RELATED APPLICATION

This application is a U.S. national stage application of PCT/JP2016/076391 filed on Sep. 8, 2016, the contents of which are incorporated herein by reference.

TECHNICAL FIELD

The present invention relates to a refrigeration cycle apparatus, in particular, to control of the power consumption amount of a compressor forming a refrigeration cycle apparatus.

BACKGROUND ART

Under conditions where a high environmental load is imposed, such as midsummer and midwinter, for example, the total amount of electric power used by a whole community may be excessively increased, making it difficult for an electric power company to maintain stable power supply. Therefore, when it becomes difficult to maintain power supply, the electric power company may transmit a demand signal requesting apparatus control for reducing the power consumption amount of an electrically powered apparatus (hereinafter referred to as the demand control). For example, the demand control is executed when a controller controlling the apparatus receives the demand signal. For instance, a refrigeration cycle apparatus that adjusts the temperature of a target, such as an air-conditioning apparatus, which significantly consumes power among home electrical appliances used in general households, is requested to perform the demand control.

Controlling the driving rotation speed of the compressor, which most affects the power consumption, is most effective in implementing the demand control in the refrigeration cycle apparatus.

After receiving the demand signal, therefore, the controller controlling the refrigeration cycle apparatus determines a target integral power amount. The controller further divides a time for performing the demand control into given periods. Then, the controller sets an integral power consumption amount for each of the periods, and uses a control value for the last period in the control in the present period to prevent the integral power consumption amount from exceeding the target integral power amount, to thereby perform demand control for reducing the power consumption (see Patent Literature 1, for example).

CITATION LIST

Patent Literature

Patent Literature 1: Japanese Unexamined Patent Application Publication No. 2014-047989

SUMMARY OF INVENTION

Technical Problem

If the refrigeration cycle apparatus continues to be operated for an extended time when there is no significant change in a surrounding environment, the temperature of the temperature adjustment target approaches a set temperature, thereby reducing the driving rotation speed of the compressor, which may result in a reduction in power consumption.

In determining a control target value of power consumption when starting the demand control after the receipt of the demand signal, as in Patent Literature 1 described above, no consideration is given to a factor such as the reduction in power consumption due to the approach of an indoor temperature to the set temperature. When reducing the power consumption with a reduction rate set relative to the power consumption in a normal operation, therefore, the control target value may fail to be set appropriately. Consequently, the resultant power consumption may significantly exceed the level to which the power consumption in the normal operation is to be reduced by the reduction rate, for example.

For example, it is possible to correct the control target value with a correction value to reset control target value. However, the correction value is affected by factors such as the environmental load and the size of the space in which the air-conditioning apparatus is installed. It is therefore difficult to set an appropriate correction value.

The present invention has been made in order to address the above-described issue, and aims at obtaining a refrigeration cycle apparatus capable of setting the control target value with higher accuracy in the demand control.

Solution to Problem

A refrigeration cycle apparatus in which demand control is conducted to adjust electric power, the refrigeration cycle apparatus comprising: a compressor with a driving rotation speed being controlled; a recording device configured to record, as data, a relationship between the driving rotation speed of the compressor and a temperature difference between a set temperature and a detected temperature, the set temperature being set as desired as a temperature control target for a temperature adjustment target, and the detected temperature being detected by a temperature detecting device disposed at a position at which a temperature of the temperature adjustment target is detected; and a main controller configured to, in response to a request for the demand control, calculate the temperature difference between the set temperature and the detected temperature, retrieve, from the recording device, data of the driving rotation speed of the compressor corresponding to the calculated temperature difference, and control the compressor based on the retrieved driving rotation speed.

Advantageous Effects of Invention

In the refrigeration cycle apparatus according to the embodiment of the present invention, the main controller determines the driving rotation speed in the demand control based on the mean driving rotation speed in the normal operation recorded on the recording device, and thus does not perform demand control depending on the driving rotation speed at the beginning of the demand control. Accordingly, it is possible to prevent failures, such as a failure to reduce the power consumption to a target reduction value and compromised comfort, due to causes such as an excessively high or low driving rotation speed at the beginning of the demand control.

DESCRIPTION OF EMBODIMENTS

Embodiments of the present invention will be described below with reference to the drawings. Here, parts denoted with identical reference signs in the following drawings are identical or similar, which applies to the entire text of Embodiments described below. Further, the forms of component elements described throughout the text of the specification are only illustrative, and the forms of component elements are not limited to these described ones. In particular, the combination of component elements is not limited to the combination in each of Embodiments, and a component element described in one of Embodiments may be applied, as appropriate, to another one of Embodiments. Further, it is assumed that high or low in pressure is not particularly defined in relation to an absolute value, and is relatively defined in a state or operation of a system or apparatus, for example.

Embodiment 1

Figure 1:
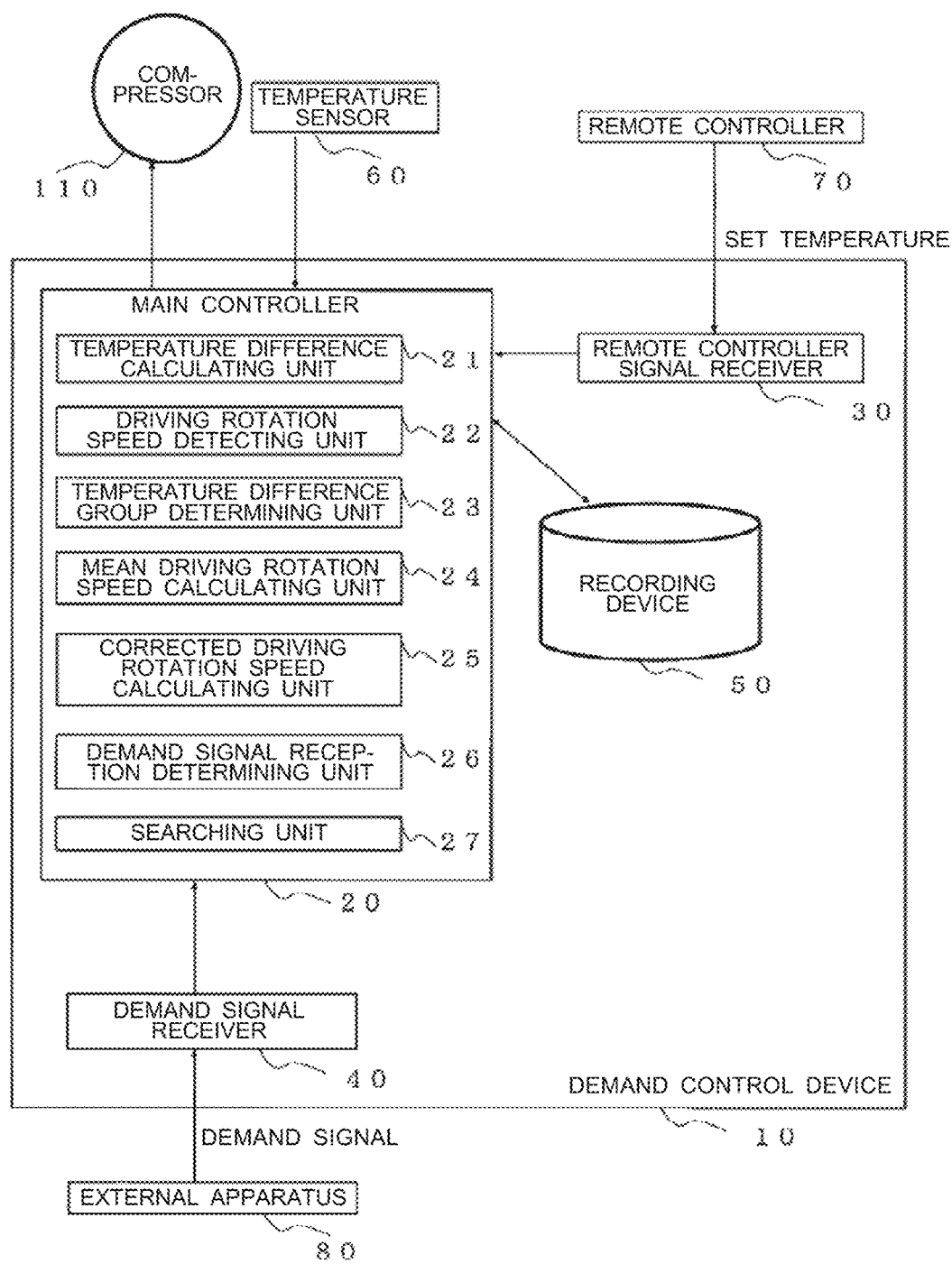
FIG. 1 is a diagram illustrating a configuration related to demand control centering on a demand control device 10 of a refrigeration cycle apparatus of Embodiment 1 of the present invention.

FIG. 1 is a diagram illustrating a configuration related to demand control centering on a demand control device 10 of a refrigeration cycle apparatus of Embodiment 1 of the present invention. As illustrated in FIG. 1, a compressor 110 sucks low-temperature, low-pressure refrigerant, and compresses and discharges the refrigerant in a high-temperature, high-pressure state. It is assumed that the compressor 110 is, for example, an inverter compressor including an inverter device (not illustrated) and having a capacity controllable with a change in the driving rotation speed. Further, a temperature sensor 60 serving as a temperature detecting device is disposed at a position in the refrigeration cycle apparatus at which the temperature of a temperature adjustment target, such as a target space, is detected. The temperature sensor 60 detects the temperature of the temperature adjustment target, and transmits the value of the detected temperature to a main controller 20 as a signal. It is assumed that the temperature sensor 60 detects an indoor temperature, and that the indoor temperature is the detected temperature.

Further, a remote controller 70 includes devices such as an input device and a display device to perform operations such as display to a user and input support for an operation or setting on the refrigeration cycle apparatus. In this example, the value of the temperature set as desired by the user as a temperature control target for an indoor space as the temperature adjustment target is input to the remote controller 70 as a set temperature. The remote controller 70 transmits a signal including the data of the set temperature to the main controller 20. Further, an external apparatus 80 of Embodiment 1 transmits a demand signal to the main controller 20.

The demand control device 10 is a device that performs demand control of the refrigeration cycle apparatus. It is assumed that the demand control device 10 performs not only the demand control but also overall control of the refrigeration cycle apparatus. In the demand control, the demand control device 10 of Embodiment 1 controls the compressor 110.

As illustrated in FIG. 1, the demand control device 10 includes the main controller 20, a remote controller signal receiver 30, a demand signal receiver 40, and a recording device 50. A description will be given on the assumption that the demand control device 10 is formed as a substrate, for example, and that the main controller 20, the remote controller signal receiver 30, the demand signal receiver 40, and the recording device 50 are devices disposed on the same substrate. However, the configuration is not limited thereto. Even with a configuration in which the devices are separately disposed on physically different substrates or the like, effects similar to those of the above-described configuration are obtainable, as long as transmission and reception of signals between the devices are possible via a communication device, for example.

The main controller 20 is a controller that performs a major role in the control of the demand control device 10. In Embodiment 1, the main controller 20 particularly performs a process related to the demand control of the driving of the aforementioned compressor 110. Therefore, the main controller 20 of Embodiment 1 includes a temperature difference calculating unit 21, a driving rotation speed detecting unit 22, a temperature difference group determining unit 23, a mean driving rotation speed calculating unit 24, a corrected driving rotation speed calculating unit 25, a demand signal reception determining unit 26, and a searching unit 27.

The temperature difference calculating unit 21 measures the value of the indoor temperature based on the signal from the temperature sensor 60. The temperature difference calculating unit 21 further performs a process of calculating a temperature difference t between the indoor temperature and the set temperature. The driving rotation speed detecting unit 22 performs a process of detecting the driving rotation speed. In this example, the driving rotation speed detecting unit 22 detects the driving rotation speed when the indoor temperature is measured in a normal operating state in which the demand control is not performed (hereinafter referred to as the normal operation). The method of detecting the driving rotation speed is not particularly limited. For example, a driving rotation speed related to the control of the compressor 110 may be used. Further, an actual driving rotation speed may be detected based on a signal transmitted from a detecting device. The temperature difference group determining unit 23 performs a process of determining which one of predetermined temperature difference groups corresponds to the temperature difference t calculated by the temperature difference calculating unit 21. In this example of Embodiment 1, the range of temperatures defining each temperature difference group is set to 1 degree Celsius. However, the range of temperatures is not particularly limited, and may be set to a given range.

The mean driving rotation speed calculating unit 24 performs a process of calculating the mean of driving rotation speeds in each temperature difference group and updating the data of the mean driving rotation speed recorded on the recording device. In this example, the mean driving rotation speed calculating unit 24 calculates the mean driving rotation speed by calculating the arithmetic mean of the driving rotation speeds, for example, although the calculation of the mean driving rotation speed is not particularly limited. In the demand control, the corrected driving rotation speed calculating unit 25 performs a process of calculating a corrected driving rotation speed by performing correction based on a power reduction rate. The demand signal reception determining unit 26 determines whether the demand signal receiver 40 has received the demand signal. Further, the searching unit 27 searches the recording device 50 to acquire data.

The remote controller signal receiver 30 receives the signal transmitted from the remote controller 70, and transmits the received signal to the main controller 20, for example. It is assumed in Embodiment 1 that the remote controller signal receiver 30 particularly processes the signal including the data of the set temperature set by the user via the remote controller 70, and transmits the processed signal to the main controller 20. The demand signal receiver 40 receives and processes the demand signal transmitted from the external apparatus 80, and transmits the processed demand signal to the main controller 20, for example.

The recording device 50 stores and records data such as data processed by the main controller 20 and data necessary for the main controller 20 to perform processing thereof. In Embodiment 1, the recording device 50 particularly records, as data, the temperature difference t between the indoor temperature and the set temperature and the mean driving rotation speed, with the temperature difference t and the mean driving rotation speed being associated with each other.

Figures 2, 3:
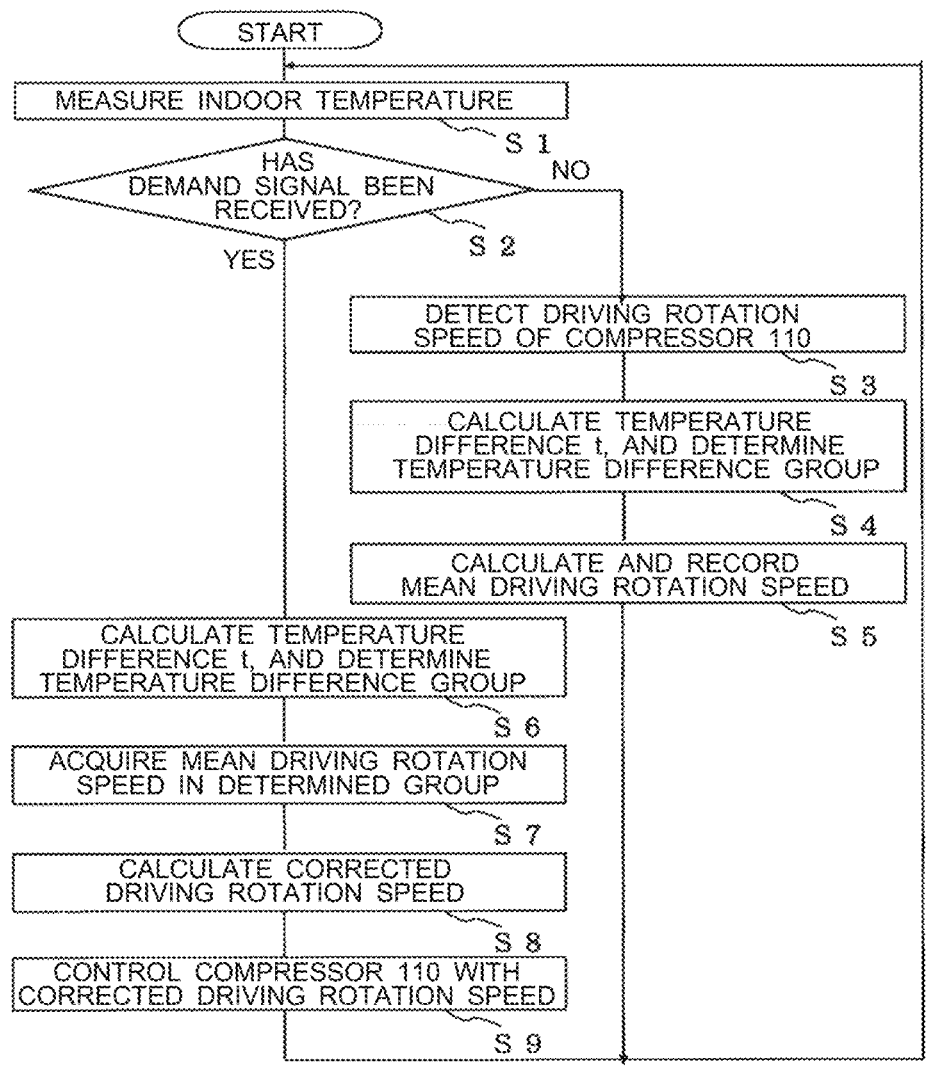
FIG. 2 is a diagram illustrating, in a table format, an example of the relationship between a temperature difference t and a mean driving rotation speed recorded on a recording device 50 of Embodiment 1 of the present invention.
FIG. 3 is a diagram illustrating a flowchart related to demand control in an air-conditioning apparatus of Embodiment 1 of the present invention.

FIG. 2 is a diagram illustrating, in a table format, an example of the relationship between the temperature difference t and the mean driving rotation speed recorded on the recording device 50 in Embodiment 1 of the present invention. FIG. 2 illustrates an example of a case in which a cooling operation is performed when the refrigeration cycle apparatus is an air-conditioning apparatus. In Embodiment 1, the temperature difference t is divided into groups depending on the value thereof, as illustrated in FIG. 2. Further, each of the groups is associated with the mean driving rotation speed of driving rotation speeds of the compressor 110. The same applies to another operation such as a heating operation, although specific numerical values may be different from those of the cooling operation.

For example, if the set temperature and the indoor temperature are 24 degrees Celsius and 27.2 degrees Celsius, respectively, the temperature difference t is 3.2 degrees Celsius. In this case, the temperature difference t corresponds to a group of 3 degrees Celsius≤t<4 degrees Celsius. The mean driving rotation speed of the compressor 110 in the group of 3 degrees Celsius≤t<4 degrees Celsius of the temperature difference t is 80.2 rps. Normally, as the temperature difference t between the indoor temperature and the set temperature is increased, the mean driving rotation speed tends to be increased.

FIG. 3 is a diagram illustrating a flowchart related to demand control in the air-conditioning apparatus of Embodiment 1 of the present invention. Based on FIG. 3, a description will be given on a process related to the demand control performed by the main controller 20 in Embodiment 1.

Based on the signal transmitted from the temperature sensor 60, the temperature difference calculating unit 21 measures the indoor temperature (step S1). Then, the demand signal reception determining unit 26 determines whether the demand signal receiver 40 has received the demand signal (step S2). It is assumed that, if the demand signal receiver 40 has received the demand signal and has not received thereafter a signal instructing to complete the demand control, the demand signal receiver 40 is continuing to receive the demand signal.

If the demand signal reception determining unit 26 determines that the demand signal receiver 40 has not received the demand signal, the driving rotation speed detecting unit 22 detects the driving rotation speed of the compressor 110 (step S3).

Then, the temperature difference calculating unit 21 calculates the temperature difference t between the indoor temperature and the set temperature. Further, the temperature difference group determining unit 23 determines which one of the temperature difference groups corresponds to the calculated temperature difference t (step S4). The mean driving rotation speed calculating unit 24 calculates the mean driving rotation speed of the compressor 110 in the determined temperature difference group, and records the calculated mean driving rotation speed on the recording device 50 (step S5). With the above-described steps, the main controller 20 performs, in the normal operation, a process of updating the data of the mean driving rotation speed recorded on the recording device 50.

Meanwhile, if the demand signal reception determining unit 26 determines at step S2 that the demand signal receiver 40 has received the demand signal, the temperature difference calculating unit 21 calculates the temperature difference t between the indoor temperature and the set temperature. Further, the temperature difference group determining unit 23 determines which one of the temperature difference groups corresponds to the calculated temperature difference t (step S6). Then, the searching unit 27 searches the recording device 50, and acquires the data of the mean driving rotation speed in the determined temperature difference group (step S7).

The corrected driving rotation speed calculating unit 25 determines the corrected driving rotation speed of the compressor 110 by correcting the value of the acquired mean compressor driving rotation speed with a given coefficient (step S8). Here, the given coefficient is a coefficient predetermined for each power reduction rate. For example, the corrected driving rotation speed calculating unit 25 determines, as the corrected driving rotation speed, a value obtained by multiplying the value of the mean driving rotation speed by the given coefficient determined based on the reduction rate. The main controller 20 controls the driving of the compressor 110 with the determined corrected driving rotation speed (step S9).

The main controller 20 periodically performs the process illustrated in FIG. 3 at certain periods. The interval between executions of the process may be set as desired. If the interval between executions of the process is excessively long, however, response to a change in the temperature difference t between the indoor temperature and the set temperature is delayed. Consequently, the compressor 110 may continue to be driven with the same corrected driving rotation speed in the demand control, even when it is desirable to change the corrected driving rotation speed. Further, the excessively long interval is expected to cause disadvantages in the normal operation, such as a reduction in the number of samples of the driving rotation speed for calculating the mean driving rotation speed and a delay in the response to the demand control. Meanwhile, if the interval between executions of the process is excessively short, and if the value of the temperature difference t is on one of the boundaries between the temperature difference groups, for example, the temperature difference group frequently changes, causing frequent fluctuations in the mean driving rotation speed, which may result in hunting and thus compromised comfort. Therefore, it is considered that approximately 10 minutes be appropriate as the interval between executions of the process.

Figure 4:
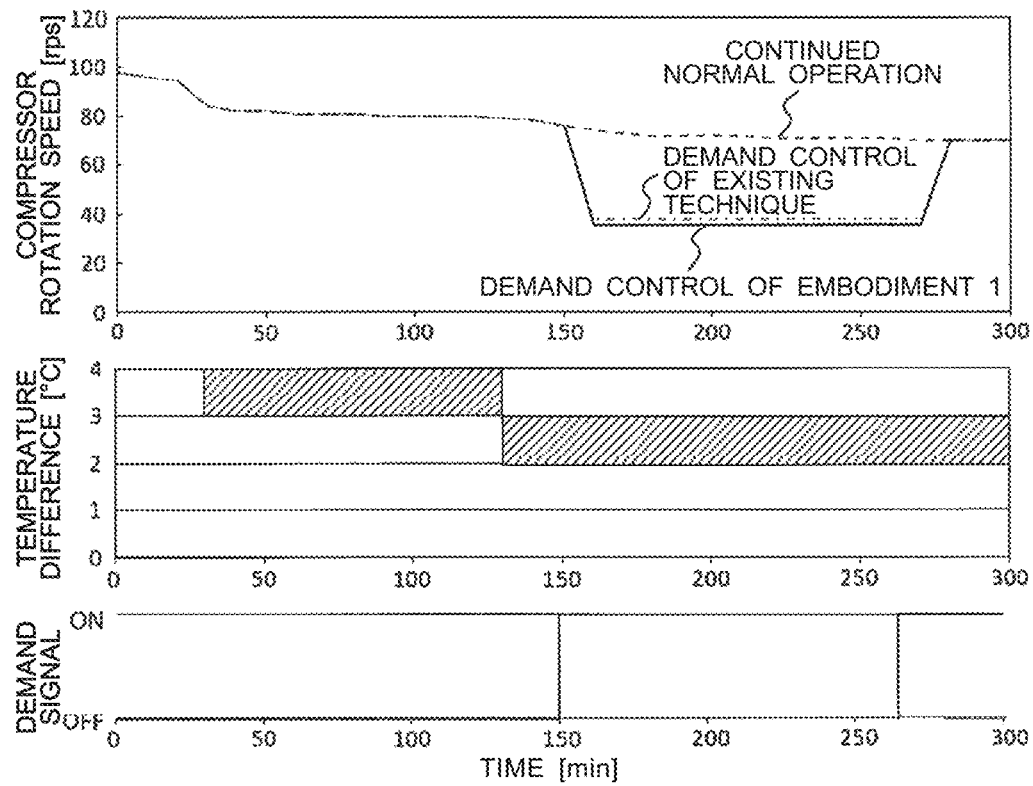
FIG. 4 is a diagram illustrating an example of respective temporal transitions of a demand signal, the temperature difference t, and a driving rotation speed in Embodiment 1 of the present invention.

FIG. 4 is a diagram illustrating an example of respective temporal transitions of the demand signal, the temperature difference t, and the driving rotation speed in Embodiment 1 of the present invention. Demand control with a reduction rate of 50% for reducing the power consumption by 50% as compared with the power consumption in the normal operation is assumed in FIG. 4.

As illustrated in FIG. 4, when the demand signal is transmitted at the time of 150 minutes after the start of the normal operation, the driving rotation speed of the compressor 110 is 76 rps, and the temperature difference t is 2 degrees Celsius. In this case, in a process according to an existing technique in which the demand control is performed based on the driving frequency at the beginning of the demand control, the demand control is performed with the driving frequency corrected based on the value of 76 rps, as represented by a dash-dotted line.

Meanwhile, in the process performed by the main controller 20 of the demand control device 10 in Embodiment 1, the corrected driving rotation speed is determined based on a value of 71.5 rps, which is a mean driving frequency recorded on the recording device 50 (see FIG. 2), as represented by a solid line. Herein, the mean driving frequency is the mean of driving frequencies in the temperature range based on the temperature difference group. Therefore, the reduction in the driving rotation speed of the compressor 110 due to the reduction in the temperature difference resulting from continuation of the operation is reflected in the mean driving frequency obtained through calculation. Accordingly, it is possible to achieve a power reduction more reflecting the power consumption in the normal operation, and thus it is possible to achieve a power reduction closer to the reduction rate.

Further, the driving rotation speed expected to be obtained by continuing the normal operation is represented by a broken line in FIG. 4. When the air-conditioning apparatus continues to operate for an extended time under the same condition and thus the power consumption is gradually reduced, the driving rotation speed of the compressor 110 is gradually reduced, as represented by the broken line.

Figure 5:
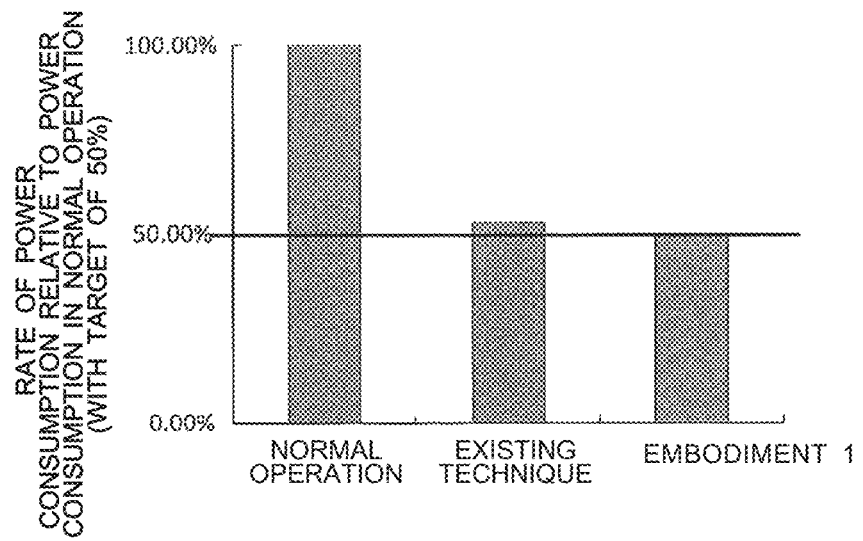
FIG. 5 is a graph illustrating an example of comparison of power consumption in Embodiment 1 of the present invention.

FIG. 5 is a graph illustrating an example of comparison of power consumption in Embodiment 1 of the present invention. The power consumption in the normal operation is determined as 100%, and the control target value in the demand control is set to 50%. In the process according to the existing technique in which the control target value is determined based on the driving frequency at the beginning of the demand control, the reduction rate does not reach 50% as the control target value.

In the process performed by the main controller 20 of the demand control device 10 of Embodiment 1, the control is performed based on the mean driving rotation speed corresponding to the temperature difference in the normal operation. Accordingly, it is possible to perform the demand control with the power consumption amount reduced by approximately a reduction rate of 50%, which is the control target.

Embodiment 2

Embodiment 1 described above includes the corrected driving rotation speed calculating unit 25 to calculate the corrected driving rotation speed by correcting the mean driving rotation speed with the given coefficient set based on the reduction rate. However, the calculation of the driving rotation speed is not limited thereto. For example, the driving rotation speed may be calculated for each reduction rate based on the mean driving rotation speed, and may be recorded on the recording device 50.

Embodiment 3

Figure 6:
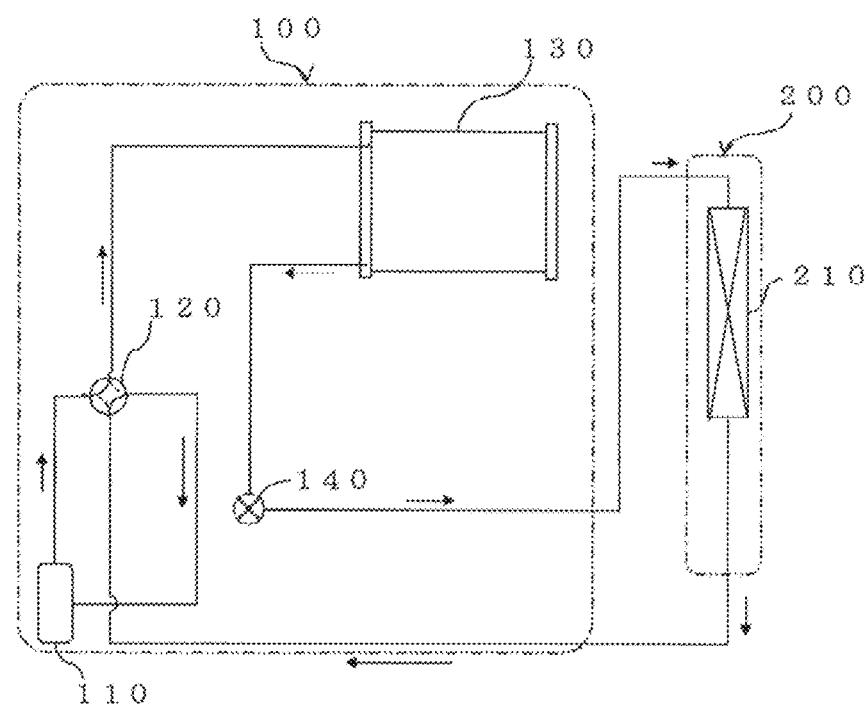
FIG. 6 is a diagram illustrating a configuration of a refrigeration cycle apparatus of Embodiment 3 of the present invention.

FIG. 6 is a diagram illustrating a configuration of a refrigeration cycle apparatus of Embodiment 3 of the present invention. With reference to FIG. 6, a description will be given on an air-conditioning apparatus as a representative example of the refrigeration cycle apparatus. As illustrated in FIG. 6, the air-conditioning apparatus of Embodiment 3 includes an outdoor unit 100 and an indoor unit 200. Further, the outdoor unit 100 and the indoor unit 200 are connected by pipes to form a refrigerant circuit that circulates refrigerant to perform air-conditioning of the target space using a refrigeration cycle.

The outdoor unit 100 of Embodiment 3 includes the compressor 110, a four-way switch valve 120, an outdoor heat exchanger 130, and an expansion valve 140. As described in Embodiment 1, the compressor 110 is assumed to be a capacity-controllable inverter compressor with an inverter device, for example. The four-way switch valve 120 serving as a refrigerant flow switching device is a valve that switches between a flow of refrigerant in cooling operation mode and a flow of refrigerant in heating operation mode. Further, the expansion valve 140 serving as a pressure reducing device (expansion device) expands the refrigerant by reducing the pressure thereof.

The outdoor heat exchanger 130 exchanges heat between air outside the indoor space (outdoor air) and the refrigerant, for example. For instance, in the heating operation, the outdoor heat exchanger 130 functions as an evaporator, and exchanges heat between low-pressure refrigerant flowing therein from the indoor unit 200 and the outdoor air to evaporate and gasify the refrigerant. Further, in the cooling operation, the outdoor heat exchanger 130 functions as a radiator (including a condenser, which applies to the following description), and exchanges heat between the refrigerant compressed in the compressor 110 and the outdoor air to transfer heat from the refrigerant or condense the refrigerant.

Further, the indoor unit 200 of Embodiment 3 includes an indoor heat exchanger 210. The indoor heat exchanger 210 exchanges heat between the refrigerant and air in an air-conditioned space (indoor air). For example, in the heating operation, the indoor heat exchanger 210 functions as a radiator, and exchanges heat between the refrigerant flowing therein from the outdoor unit 100 and the indoor air. In this process, the indoor heat exchanger 210 transfers heat from the refrigerant or condenses the refrigerant, and discharges the refrigerant to the outdoor unit 100. Meanwhile, in the cooling operation, the indoor heat exchanger 210 functions as an evaporator, and exchanges heat between the refrigerant having passed through the expansion valve 140 and the indoor air, for example. In this process, the indoor heat exchanger 210 causes the refrigerant to remove the heat of the indoor air to evaporate and gasify the refrigerant, and discharges the refrigerant to the outdoor unit 100.

An operation of the air-conditioning apparatus of Embodiment 3 will now be described based on the flow of refrigerant. The cooling operation will first be described. High-temperature, high-pressure gas refrigerant compressed and discharged by the compressor 110 passes through the four-way switch valve 120, and flows into the outdoor heat exchanger 130. Then, the refrigerant passes through the outdoor heat exchanger 130, and exchanges heat with the outdoor air to be condensed and liquefied. The condensed and liquefied refrigerant (liquid refrigerant) flows into the expansion valve 140. The refrigerant is reduced in pressure by the expansion valve 140 to be brought into a two-phase gas-liquid state, and flows out from the outdoor unit 100.

The two-phase gas-liquid refrigerant flowing out from the outdoor unit 100 flows into the indoor unit 200 through pipes, and passes through the indoor heat exchanger 210. The refrigerant then exchanges heat with the air in the indoor space, for example, to be evaporated and gasified. The evaporated and gasified refrigerant (gas refrigerant) flows out from the indoor unit 200.

The gas refrigerant flowing out from the indoor unit 200 flows into the outdoor unit 100 through pipes. The refrigerant then passes through the four-way switch valve 120, and is again sucked into the compressor 110. With the refrigerant in the air-conditioning apparatus circulating in the above-described manner, cooling is performed.

The heating operation will now be described based on the flow of refrigerant. The high-temperature, high-pressure gas refrigerant compressed and discharged by the compressor 110 passes through the four-way switch valve 120, and flows out from the outdoor unit 100. The gas refrigerant flowing out from the outdoor unit 100 flows into the indoor unit 200 through pipes. Then, while passing through the indoor heat exchanger 210, the refrigerant exchanges heat with the air in the indoor space, for example, to be condensed and liquefied, and flows out from the indoor unit 200.

The refrigerant flowing out from the indoor unit 200 flows into the outdoor unit 100 through pipes. The refrigerant is then reduced in pressure by the expansion valve 140 to be brought into a two-phase gas-liquid state, and flows into the outdoor heat exchanger 130. Then, the refrigerant passes through the outdoor heat exchanger 130, and exchanges heat with the outdoor air to be evaporated and gasified. The evaporated and gasified refrigerant (gas refrigerant) passes through the four-way switch valve 120, and is again sucked into the compressor 110. With the refrigerant in the air-conditioning apparatus circulating in the above-described manner, heating is performed.

As described above, the demand control device 10 described in Embodiment 1 is capable of reducing power consumption by performing the demand control on a refrigeration cycle apparatus such as the air-conditioning apparatus of Embodiment 3.

Embodiment 4

In Embodiments 1 to 3 described above, the demand control of the compressor 110 has been described. However, demand control similar to that performed on the compressor 110 may be performed on, for example, a fan that sends air to the outdoor heat exchanger 130 and a fan that sends air to the indoor heat exchanger 210 in the refrigerant cycle apparatus.

REFERENCE SIGNS LIST 1 demand control device 10 demand control device 20 main controller 21 temperature difference calculating unit 22 driving rotation speed detecting unit 23 temperature difference group determining unit 24 mean driving rotation speed calculating unit 25 corrected driving rotation speed calculating unit 26 demand signal reception determining unit 27 searching unit 30 remote controller signal receiver 40 demand signal receiver 50 recording device 60 temperature sensor 70 remote controller 80 external apparatus 100 outdoor unit 110 compressor 120 four-way switch valve 130 outdoor heat exchanger 140 expansion valve 200 indoor unit 210 indoor heat exchanger

The invention claimed is:

1. A refrigeration cycle apparatus in which demand control is performed to adjust electric power,
   the refrigeration cycle apparatus comprising:
      a compressor with a driving rotation speed being controlled;
      a recording device configured to record data relating to a relationship between the mean driving rotation speed being a mean of the driving rotation speed of the compressor and a temperature difference between a set temperature and a detected temperature, the set temperature being set for a temperature adjustment target, and the detected temperature being detected from the temperature adjustment target; and
      a main controller configured to calculate the temperature difference between the set temperature and the detected temperature, calculate the mean driving rotation speed of the compressor when there is no request for the demand control, to thereby update the data relating to the relationship between the temperature difference and the mean driving rotation speed recorded on the recording device, and, in response to a request for the demand control, obtain from the recording device, the mean driving rotation speed corresponding to the temperature difference, and to control the compressor,
      wherein, in response to a request for the demand control, the main controller controls the compressor based on the mean driving rotation speed obtained from the recording device, and when there is no request for the demand control, controls the driving rotation speed of the compressor based on the difference between the set temperature and the detected temperature.

2. The refrigerant cycle apparatus of claim 1, wherein the set temperature is set as desired as a temperature control target for the temperature adjustment target.

3. The refrigerant cycle apparatus of claim 1, further comprising a temperature detecting device disposed at a position at which a temperature of the temperature adjustment target is detected.

4. The refrigerant cycle apparatus of claim 1, wherein
   the temperature difference is divided up into a plurality of predetermined temperature difference groups, and
   the main controller determines a temperature difference group corresponding to the calculated temperature difference among the plurality of temperature difference groups, and calculates the mean driving rotation speed in the determined temperature difference group, to thereby update the data relating the relationship between the temperature difference and the mean driving rotation speed.

* * * * *